United States Patent
Yamada et al.

(10) Patent No.: US 11,400,883 B2
(45) Date of Patent: Aug. 2, 2022

(54) OCCUPANT PROTECTION DEVICE

(71) Applicant: TOYODA GOSEI CO., LTD., Kiyosu (JP)

(72) Inventors: Shinji Yamada, Ichinomiya (JP); Kazumi Fukaura, Kiyosu (JP); Takeki Hayashi, Kiyosu (JP); Takashi Ichimura, Kiyosu (JP); Yasushi Masuda, Kiyosu (JP); Yuji Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/194,510

(22) Filed: Mar. 8, 2021

(65) Prior Publication Data

US 2021/0300292 A1    Sep. 30, 2021

(30) Foreign Application Priority Data

Mar. 31, 2020 (JP) .............................. JP2020-061819

(51) Int. Cl.
| B60R 21/2338 | (2011.01) |
| B60R 21/206 | (2011.01) |
| B60R 21/207 | (2006.01) |
| B60R 21/231 | (2011.01) |

(52) U.S. Cl.
CPC ........ *B60R 21/2338* (2013.01); *B60R 21/206* (2013.01); *B60R 21/207* (2013.01); *B60R 2021/23107* (2013.01)

(58) Field of Classification Search
CPC . B60R 21/2338; B60R 21/206; B60R 21/207; B60R 2021/23107; B60R 21/18; B60N 2/42718; B60N 2/688
See application file for complete search history.

(56) References Cited

U.S. PATENT DOCUMENTS

| 2006/0028004 A1* | 2/2006 | Oota ..................... B60R 21/231 280/733 |
| 2015/0061268 A1* | 3/2015 | Nagasawa ............. B60R 21/231 280/730.1 |
| 2018/0272981 A1 | 9/2018 | Nagasawa |

(Continued)

FOREIGN PATENT DOCUMENTS

| DE | 10039661 A1 * | 3/2001 | ....... B60R 21/23138 |
| DE | 102019118841 A1 * | 1/2021 | ........... B60R 21/231 |

(Continued)

*Primary Examiner* — Drew J Brown
(74) *Attorney, Agent, or Firm* — Posz Law Group, PLC

(57) ABSTRACT

An occupant protection device, which protects an occupant seated in a seat, includes: a seat belt; a front airbag device provided with a front airbag which is placed in an area of a lap belt and inflates to cover a front of the occupant when operated; and a seat airbag device provided with a seat airbag which is arranged inside a seat portion in the seat and inflates so as to raise at least a front portion side of the seat portion upward. The front airbag causes inflation gas to flow into the inside and inflates so as to protrude forward and upward when operated and a thigh abutment surface abutting on a thigh of the occupant and an upper body restraining surface restraining an upper body of the occupant are arranged on an outer peripheral surface of the front airbag when the inflation is completed.

1 Claim, 14 Drawing Sheets

(56) References Cited

U.S. PATENT DOCUMENTS

| | | |
|---|---|---|
| 2018/0319296 A1 | 11/2018 | Sasaki et al. |
| 2019/0054888 A1 | 2/2019 | Fukawatase et al. |
| 2020/0238943 A1 | 7/2020 | Fukawatase et al. |
| 2020/0290545 A1* | 9/2020 | Walker .................. B60R 21/207 |
| 2020/0298780 A1* | 9/2020 | Kanegae ................ B60N 2/002 |
| 2020/0298984 A1* | 9/2020 | Walker .................. B64D 25/06 |

FOREIGN PATENT DOCUMENTS

| | | | | |
|---|---|---|---|---|
| DE | 102021000984 A1 | * | 4/2021 | ............. B60R 21/18 |
| JP | 2008001275 A | * | 1/2008 | ........... B60R 21/045 |
| JP | 2018-161975 A | | 10/2018 | |
| JP | 2018-188123 A | | 11/2018 | |
| JP | 2019-34698 A | | 3/2019 | |

* cited by examiner

FIG.4
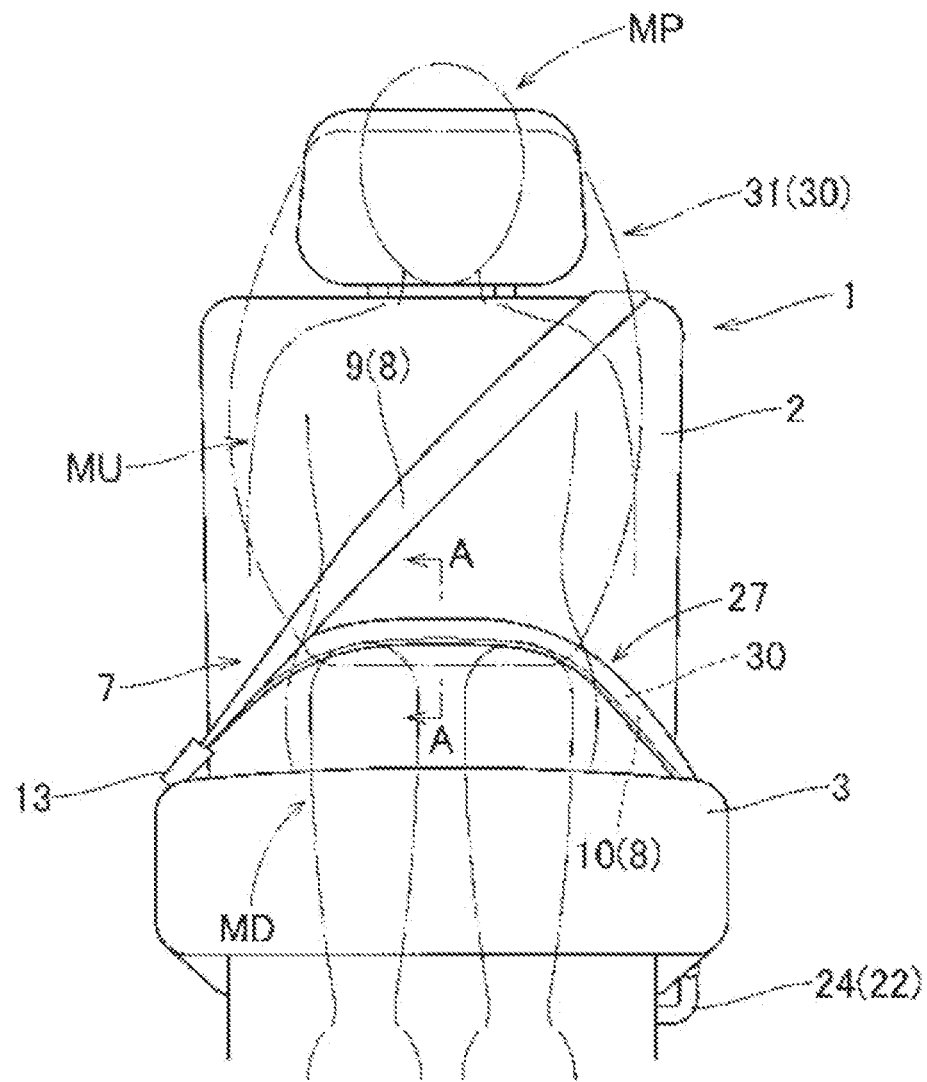
A-A PART SCHEMATIC CROSS SECTION
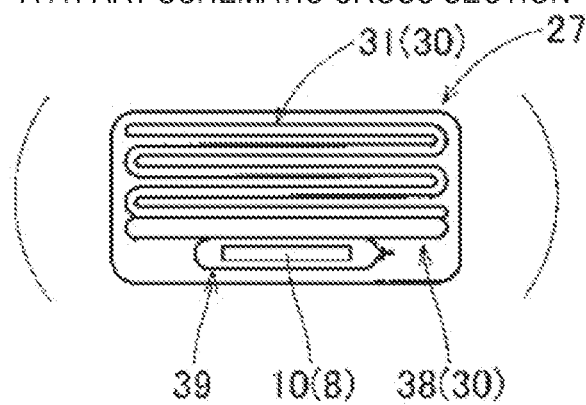

OCCUPANT PROTECTION DEVICE

CROSS-REFERENCE TO RELATED APPLICATION(S)

This application is based upon and claims the benefit of priority from prior Japanese patent application No. 2020-061819 filed on Mar. 31, 2020, the entire contents of which are incorporated herein by reference.

BACKGROUND

1. Field of the Invention

The present invention relates to an occupant protection device for protecting an occupant seated in a seat.

2. Description of the Related Art

In a recent year, as an occupant protection device, there is provided a device with a configuration including a front airbag which is placed in an area of a lap belt in a seat belt and inflates to cover a front of an occupant and an upper airbag and a lower airbag which respectively inflate in front of the front airbag so that front surface sides are supported by a front windshield and an instrument panel (see JP-A-2019-34698, for example). In this occupant protection device, the front airbag is configured to inflate so as to protrude from the lap belt toward the front and upward, and by interposing the front airbag between the upper airbag, the lower airbag, and an upper body of the occupant, the occupant is restrained by the front airbag, the upper airbag, and the lower airbag.

Also, as an occupant protection device, there is provided a device with a configuration including a front airbag which is placed in an area of a lap belt in a seat belt and inflates so that it protrudes forward and upward from the lap belt and a front waist airbag which inflates between the lap belt and an occupant waist (see JP-A-2018-161975, for example).

However, in the occupant protection device described in JP-A-2019-34698, since the upper airbag and the lower airbag are arranged on a vehicle body side, for example, when restraining an occupant seated in a seat that is slid significantly backwards with respect to the front windshield and instrument panel, there may be a gap between the inflated front airbag and the upper and lower airbags. As a result, in some cases, the forward movement of the waist of the occupant cannot be suppressed and the occupant cannot be accurately restrained. Further, in the occupant protection device described in JP-A-2018-161975, although the front waist airbag is inflated between the lap belt and the waist of the occupant to prevent the waist of the occupant from moving forward, this front waist airbag has a small height at the completion of inflation, which is almost the same as the width of the lap belt. As a result, there is a risk that the forward movement of the waist of the occupant cannot be accurately regulated.

SUMMARY

An object of the invention is to solve the problems described above and to provide an occupant protection device capable of accurately regulating a forward movement of a waist and stably protecting an occupant.

According to an aspect of the invention, there is provided an occupant protection device which protects an occupant seated in a seat including: a seat belt; a front airbag device provided with a front airbag which is placed in an area of a lap belt which restrains a waist of the occupant in the seat belt when worn and inflates to cover a front of the occupant when operated; and a seat airbag device provided with a seat airbag which is arranged inside a seat portion in the seat and inflates so as to raise at least a front portion side of the seat portion upward when operated to regulate a forward movement of the occupant, where the front airbag causes inflation gas to flow into the inside and inflates so as to protrude forward and upward when operated and a thigh abutment surface capable of abutting on a thigh of the occupant and an upper body restraining surface capable of restraining an upper body of the occupant are arranged on an outer peripheral surface of the front airbag when the inflation is completed.

The occupant protection device of the invention has a configuration including the front airbag device arranged in the area of the lap belt and the seat airbag device built in the seat portion of the seat. Also, the occupant protection device has a configuration in which the front airbag inflates so as to cover the front of the occupant and the seat airbag inflates so as to raise at least the front portion side of the seat portion upward. Therefore, the inflated seat airbag regulates the forward movement of the buttocks of the occupant and can regulate the waist of the occupant from moving forward. Then, the occupant whose front movement of the waist is restricted by the seat airbag is received by the front airbag which is inflated so as to protrude forward and upward from the lap belt. In this case, the inflated front airbag is arranged in front of the upper body of the occupant while bringing the thigh abutment surface into contact with the upper surface of the thigh of the occupant. Therefore, even when the occupant in a state where the forward movement of the waist is suppressed by the seat airbag moves so as to bring the upper body closer to the lower body, the front airbag makes the thigh abutment surface supported over a wide area by the thigh, and thus the collapse and compression are suppressed. As a result, the upper body (from the chest to the head) of the occupant can be accurately restrained by the upper body restraining surface.

Therefore, in the occupant protection device of the invention, the forward movement of the waist can be accurately regulated, and thus the occupant can be stably protected.

Further, the occupant protection device may have the following configuration.

According to another aspect of the invention, there is provided an occupant protection device which protects an occupant seated in a seat including: a seat belt; a front airbag device provided with a front airbag which is placed in an area of a lap belt which restrains a waist of the occupant in the seat belt when worn and inflates to cover a front of the occupant when operated; and a floor airbag device provided with a floor airbag which is placed in front of the occupant seated on the seat on a floor and inflates to cover a front of the occupant from a shin to a knee when operated to regulate a forward movement of the occupant, where: the seat is configured to be fixed to the floor so that it is restricted from moving back and forth; and the front airbag causes inflation gas to flow into the inside and inflates so as to protrude forward and upward when operated and a thigh abutment surface capable of abutting on a thigh of the occupant and an upper body restraining surface capable of restraining an upper body of the occupant are arranged on an outer peripheral surface of the front airbag when the inflation is completed.

In the occupant protection device with the configuration described above, since the seat is fixed so as to be restricted from moving back and forth with respect to the floor, the floor airbag device arranged in front of the occupant seated on the seat can inflate the floor airbag in a state where the distance to the seat is constant at the time of operation. Therefore, the floor airbag can be inflated so as to accurately cover the front of the occupant from the shin to the knee without being extremely far apart or extremely close to the seat. Therefore, by covering the area from the shin to the knee with the inflated floor airbag, the forward movement of the buttocks of the occupant can be restricted and the waist of the occupant can be restricted from moving forward. Then, the occupant in which the forward movement of the waist is suppressed is received by the front airbag which inflates so as to protrude forward and upward from the lap belt. In this case, the front airbag is arranged in front of the upper body of the occupant while bringing the thigh abutment surface into contact with the upper surface of the thigh of the occupant. Therefore, even when the occupant in a state where the forward movement of the waist is suppressed by the floor airbag moves the upper body closer to the lower body, since the front airbag makes the thigh abutment surface supported over a wide area by the thigh, and thus the collapse and compression are suppressed. As a result, the upper body (from chest to the head) of the occupant can be accurately restrained by the upper body restraining surface.

Therefore, also in the occupant protection device with the configuration described above, the forward movement of the waist can be accurately regulated, and thus the occupant can be stably protected.

Further, the occupant protection device may have the following configuration.

According to still another aspect of the invention, there is provided an occupant protection device which protects an occupant seated in a seat including: a seat belt; a front airbag device provided with a front airbag which is placed in an area of a lap belt which restrains a waist of the occupant in the seat belt when worn and inflates to cover a front of the occupant when operated a seat airbag device provided with a seat airbag which is arranged inside a seat portion in the seat and inflates so as to raise at least a front portion side of the seat portion upward when operated to regulate a forward movement of the occupant; and a floor airbag device provided with a floor airbag which can be slidably moved following a sliding movement of the seat in front of the occupant seated on the seat on a floor and inflates to cover a front of a knee of the occupant when operated to regulate a forward movement of the occupant, where the front airbag causes inflation gas to flow into the inside and inflates so as to protrude forward and upward when operated and a thigh abutment surface capable of abutting on a thigh of the occupant and an upper body restraining surface capable of restraining an upper body of the occupant are arranged on an outer peripheral surface of the front airbag when the inflation is completed.

In the occupant protection device with the configuration described above, since the floor airbag device placed in front of the occupant seated on the seat on the floor is configured to be slidable following the slide movement of the seat, at the time of operation, the floor airbag can be inflated with a constant distance from the seat. Therefore, the floor airbag can be inflated so as to accurately cover the front of the occupant from the shin to the knee without being extremely far apart or extremely close to the seat. Furthermore, in the occupant protection device, the seat airbag device is built in a seat portion of the seat and the seat airbag is configured to inflate so as to raise at least the front portion side of the seat portion upward. Therefore, the inflated floor airbag and the seat airbag regulate the forward movement of the buttocks of the occupant and the waist of the occupant can be accurately regulated to move forward. Then, the occupant in which the forward movement of the waist is suppressed by the seat airbag and the floor airbag is received by the front airbag which inflates so as to protrude forward and upward from the lap belt. In this case, the front airbag is arranged in front of the upper body of the occupant while bringing the thigh abutment surface into contact with the upper surface of the thigh of the occupant. Therefore, even when the occupant in a state where the forward movement of the waist is suppressed by the floor airbag and the seat airbag moves the upper body closer to the lower body, since the airbag makes the thigh abutment surface supported over a wide area by the thigh, and thus the collapse and compression are suppressed. As a result, the upper body (from the chest to the head) of the occupant can be accurately restrained by the upper body restraining surface.

Therefore, even in the occupant protection device with the configuration described above, the forward movement of the waist can be accurately regulated, and thus the occupant can be stably protected.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 4 is a front view of the seat on which the occupant protection device of the first embodiment is mounted and illustrates the state in which the seat belt is fastened;

DETAILED DESCRIPTION OF THE INVENTION

Hereinafter, an embodiment of the invention will be described with reference to the drawings. In the embodiment, the front-rear, up-down, and left-right directions coincide with the front-rear, up-down, and left-right directions of a seat unless otherwise specified.

Figure 1:
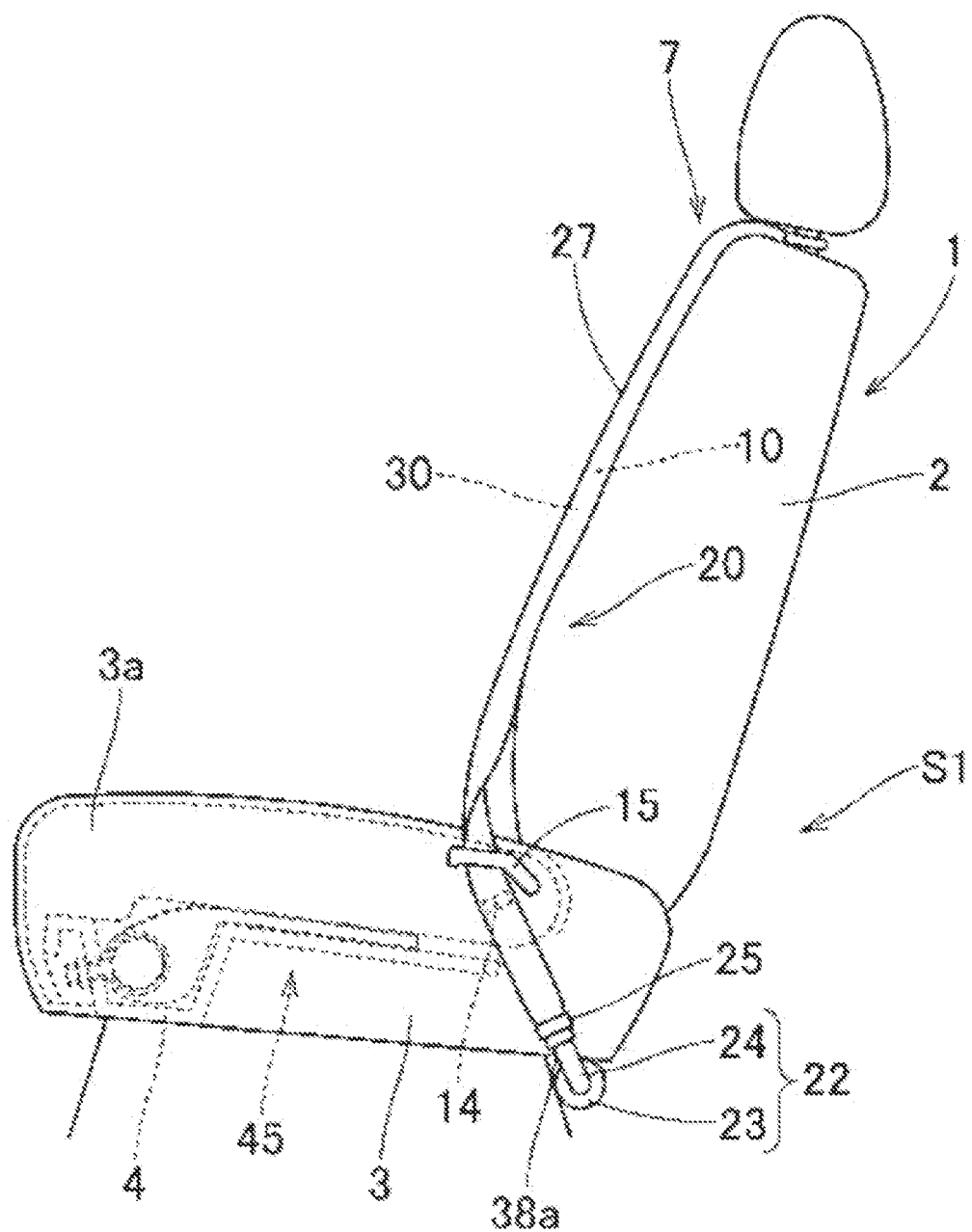
FIG. 1 is a schematic side view of a seat on which an occupant protection device according to a first embodiment of the invention is mounted.
Figure 2:
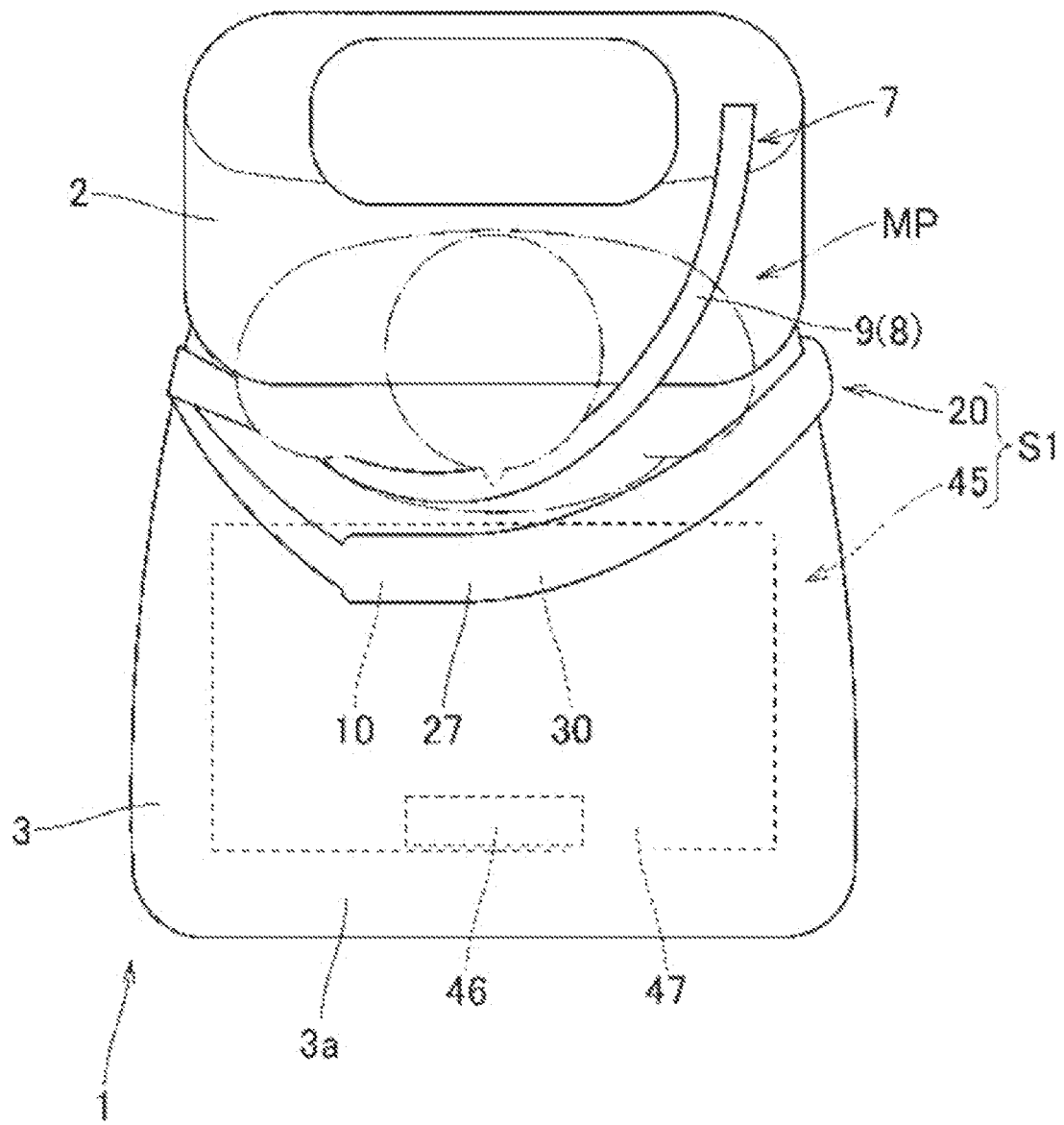
FIG. 2 is a schematic plan view of the seat on which the occupant protection device of the first embodiment is mounted and illustrates a state in which a seat belt is fastened.

First, an occupant protection device S1 of a first embodiment will be described. The occupant protection device S1 of the first embodiment is for protecting an occupant seated on a seat 1. As illustrated in FIGS. 1 and 2, the occupant protection device S1 includes a seat belt 7, a front airbag device 20, and a seat airbag device 45 arranged inside a seat portion 3 of the seat 1. The seat 1 includes a backrest portion 2 and the seat portion 3.

Figure 3:
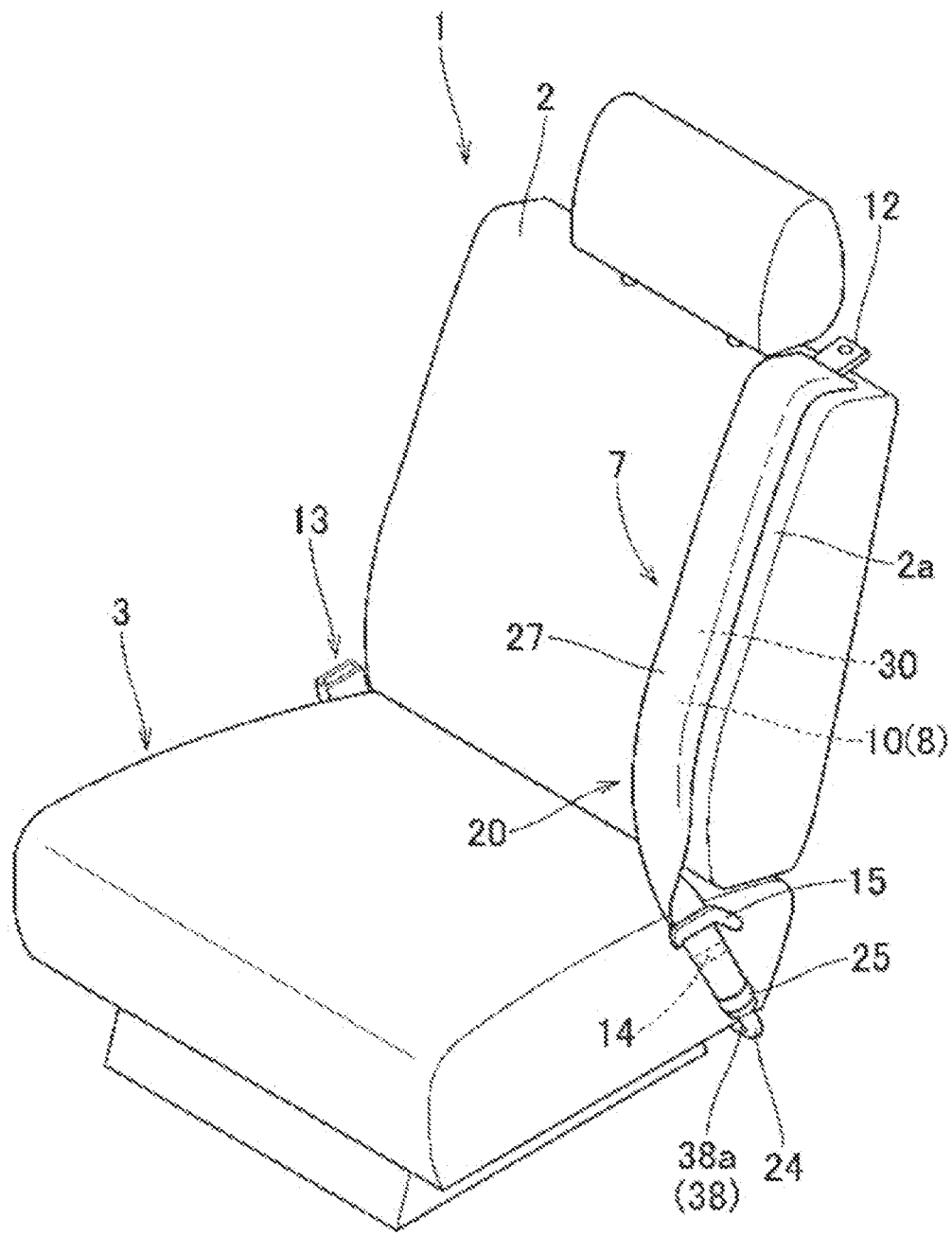
FIG. 3 is a schematic perspective view of the seal on which the occupant protection device of the first embodiment is mounted.

The seat belt 7 is configured to include a belt body 8 for restraining an occupant MP seated on the seat 1, a tongue plate 12 attached to the belt body 8, and a buckle 13 for connecting the tongue plate 12. One end of the belt body 8 is locked to a take-up shall of a retractor (not illustrated) arranged in the backrest portion 2 and the other end is locked to an anchor member 14 (see FIGS. 1 and 3) arranged on a left side of a rear end of the seat portion 3 in the seat 1. Specifically, the belt body 8 is arranged so as to be exposed to the outside from an upper left edge side of the backrest portion 2. In the case of the embodiment, in the non-seat state of the occupant, as illustrated in FIGS. 1 and 3, the belt body 8 is configured to expose a lap belt 10 for accommodating a front airbag 30, which will be described below, to the front surface of the backrest portion 2. The belt body 8 includes the lap belt 10 and a shoulder belt 9 accommodated in the backrest portion 2, In a state where the tongue plate 12 is connected to the buckle 13 when the occupant is seated, a lower body MD (waist MW) of the occupant MP is restrained by the lap belt 10 arranged substantially along the left-right direction between the anchor member 14 and the buckle 13 and an upper body MU (from the shoulder to the chest) of the occupant MP is restrained by the shoulder belt 9 which extends diagonally from an upper left edge side of the backrest portion 2 to the buckle 13 (see FIGS. 2 and 4). For details, as illustrated in FIGS. 1 and 3, the lap belt 10 is exposed to the front surface of the backrest portion 2 on a left edge 2a side of the backrest portion 2 so as to substantially follow the up-down direction in a non-seat state of the occupant MP.

The front airbag device 20 includes the front airbag 30 which is folded and arranged in the area of the lap belt 10 and an inflator 22 which supplies inflation gas to the front airbag 30.

The inflator 22 is arranged at a position below the seating surface of the seat portion 3 in the seat 1. In the case of the embodiment, as illustrated in FIG. 1, the inflator 22 includes an inflator body 23 (detailed illustration is not shown) and a pipe portion 24 extending from the inflator body 23 and supplying inflation gas to the front airbag 30. The pipe portion 24 extends from the inflator body 23 and is arranged so that the tip thereof is located on the left side of the seat 1 near a boundary portion between the seat portion 3 and the backrest portion 2. The tip of the pipe portion 24 is connected to a conduit portion 38 described below in the front airbag 30 by using a clamp 25 (see FIGS. 1 and 3).

Figure 5:
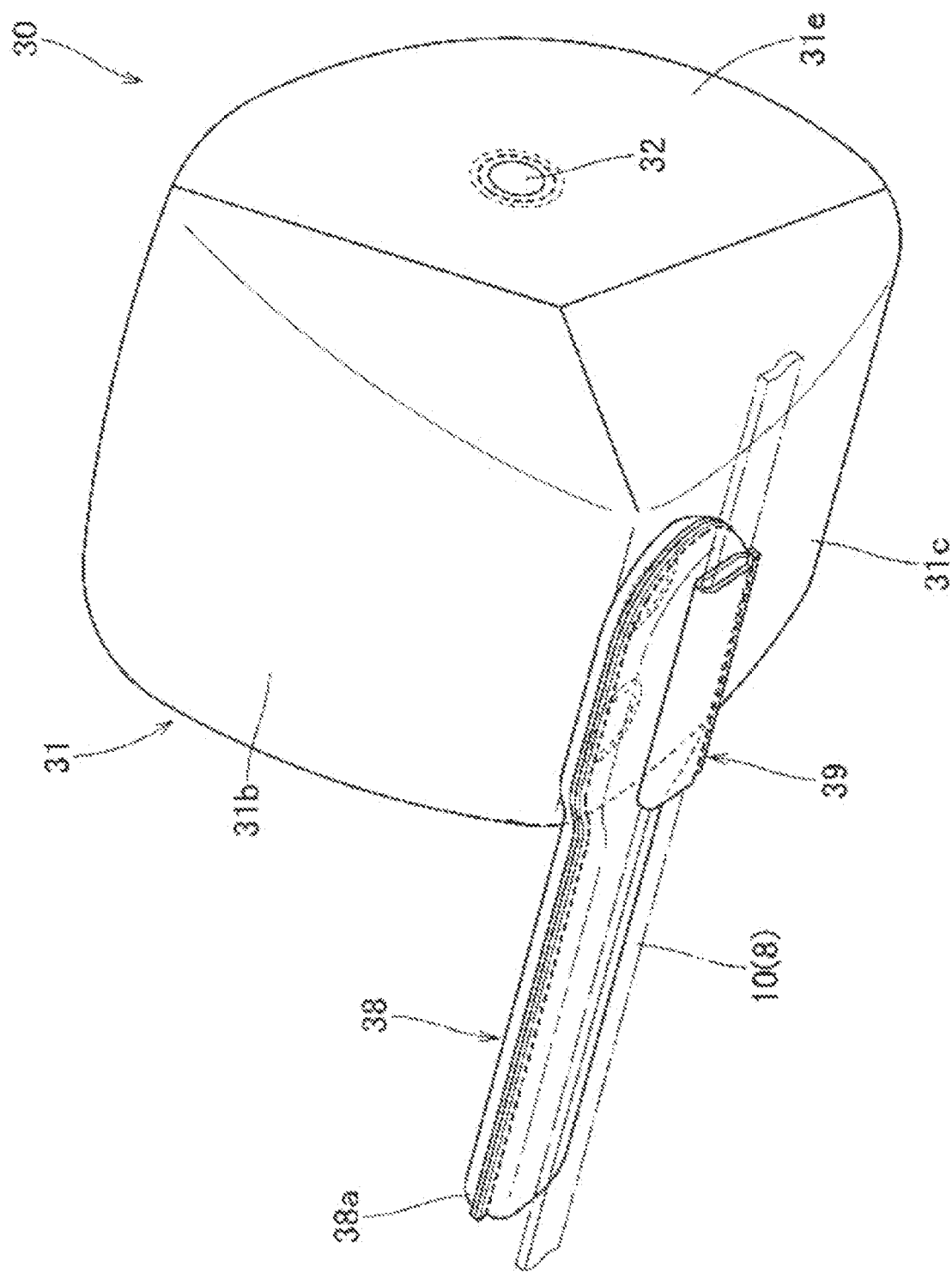
FIG. 5 is a schematic perspective view illustrating a state in which an airbag used in the occupant protection device of the first embodiment is inflated by itself.
Figure 6:
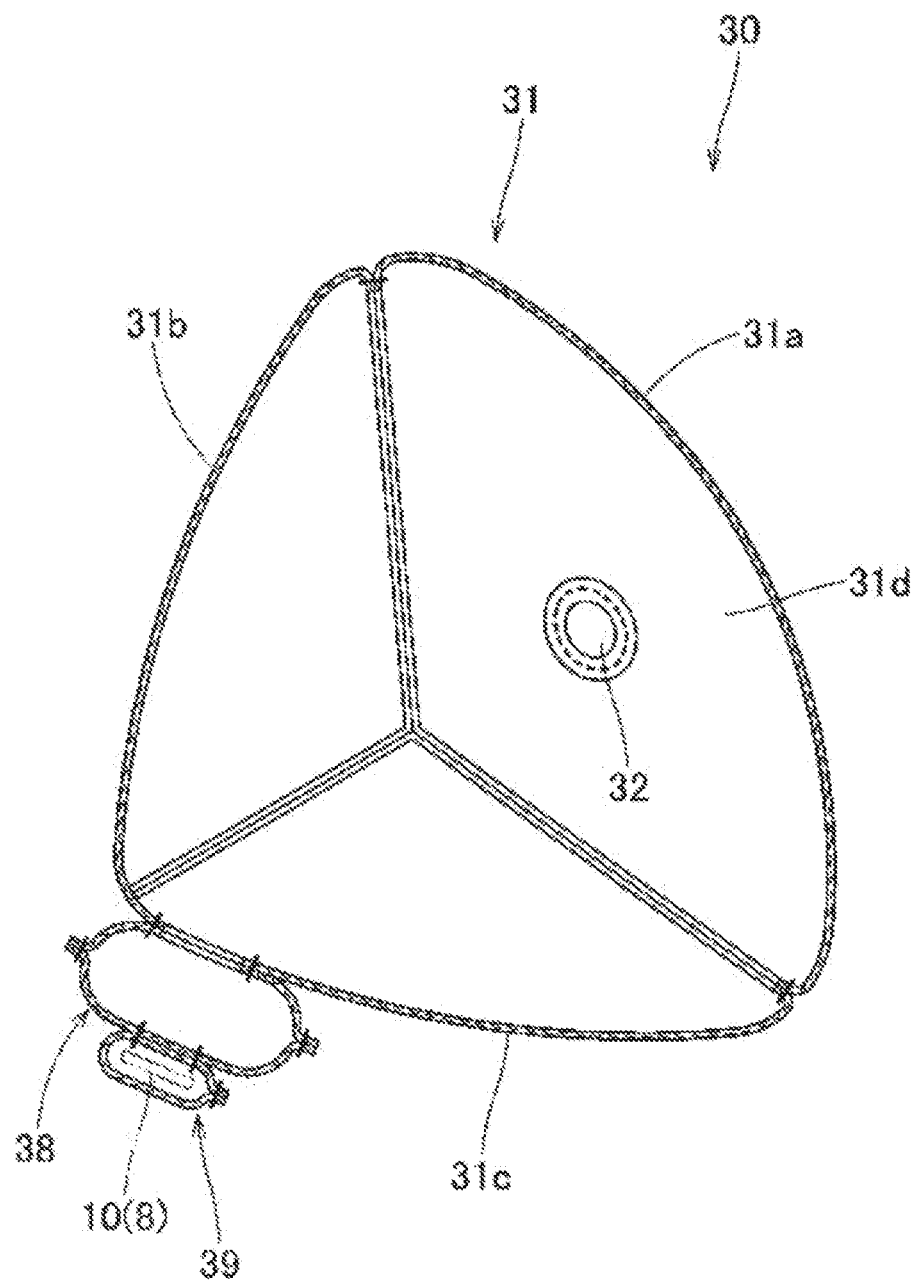
FIG. 6 is a schematic vertical cross-sectional view of the airbag of FIG. 5.

The front airbag 30 has a bag shape composed of a flexible seat body. As illustrated in FIGS. 5 and 6, the front airbag 30 includes a bag body 31, the conduit portion 38 connected to the inflator 22 to allow inflation gas to flow into the bag body 31, and a belt attachment portion 39 through which the lap belt 10 is inserted.

The bag body 31 is folded into a long shape and is arranged in the area of the lap belt 10 so as to be overlapped on an upper surface side of the lap belt 10 in the seat belt 7 when worn (see FIG. 4). That is, in anon-wearing state as illustrated IN FIGS. 1 and 3, the front airbag 30 (folded bag body 31 and conduit 38) is arranged on the back side (backrest portion 2 side) of the lap belt 10. In the case of the embodiment, the folded bag body 31 and the lap belt 10 are integrated by being covered with a cover 27 which can be broken when the front airbag 30 is deployed and inflated, as illustrated in FIG. 4.

Figure 8:
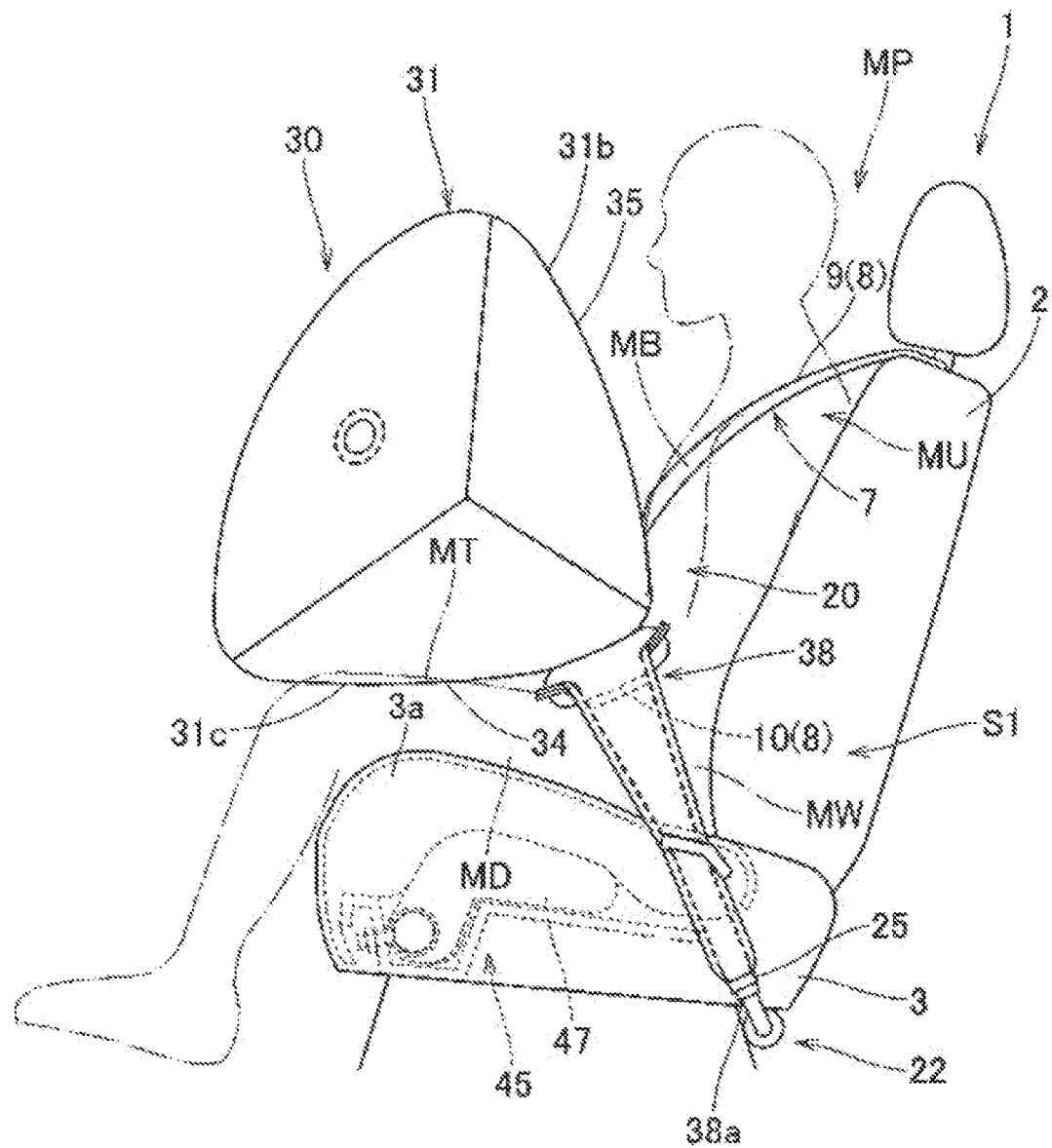
FIG. 8 is a side view of the seat in a state where a front airbag and a seat airbag complete inflation in the occupant protection device of the first embodiment.

In the case of the embodiment, in the bag body 31, the external shape when inflation is completed has a substantially triangular prism shape in which an axial direction is substantially along the left-right direction, as illustrated in FIGS. 5, 6, and 8. More specifically, the hag body 31 has a substantially right-angled triangular shape with a hypotenuse on the front side in an inflation completed shape when viewed from the left and right sides and the inflation completed shape when viewed from the front-rear direction side is configured to be a substantially rectangular shape widened vertically (see the alternate long and short dash line in FIG. 4). The bag body 31 is configured to include a front wall portion 31a arranged on the front side away from the occupant MP when the inflation is completed, a rear upper wall portion 31b and a rear lower wall portion 31c arranged on the occupant MP side when the inflation is completed, and a left wall portion 31d and a right wall portion 31e arranged to face each other on the left-right direction side when the inflation is completed (see FIGS. 5 and 6). Then, in the bag body 31 of the embodiment, the rear lower wall portion 31c forms a thigh abutment surface 34 capable of abutting on a thigh MT of the occupant MP when the inflation is completed and the rear upper wall portion 31h forms an upper body restraining surface 35 which is arranged in front of the occupant MP when the inflation is completed and can restrain the upper body MU (from a chest MB to the head) of the occupant MP. The bag body 31 is provided with vent holes 32 for exhausting excess inflation gas which has flowed into the bag at the left wall portion 31d and the right wall portion 31e. Further, the bag body 31 is communicated with the conduit portion 38 through a communication hole (the figure and reference number are not shown) at a portion on the rear lower end side when the inflation is completed.

The conduit portion 38 is connected to the pipe portion 24 of the inflator 22 in a substantially tubular shape having an opening on the tip side extending from the hag body 31. The conduit portion 38 is configured to be arranged substantially along the lap belt 10 in the left-right direction when the inflation of the front airbag 30 is completed. The conduit portion 38 has a configuration in which a tip 38a side is connected to the pipe portion 24 of the inflator 22 by using the clamp 25 as described above. On the lower surface side of the conduit portion 38, the substantially tubular belt attachment portion 39 having both ends opened so that the lap belt 10 can be inserted is arranged (see FIGS. 5 and 6).

Figure 7:
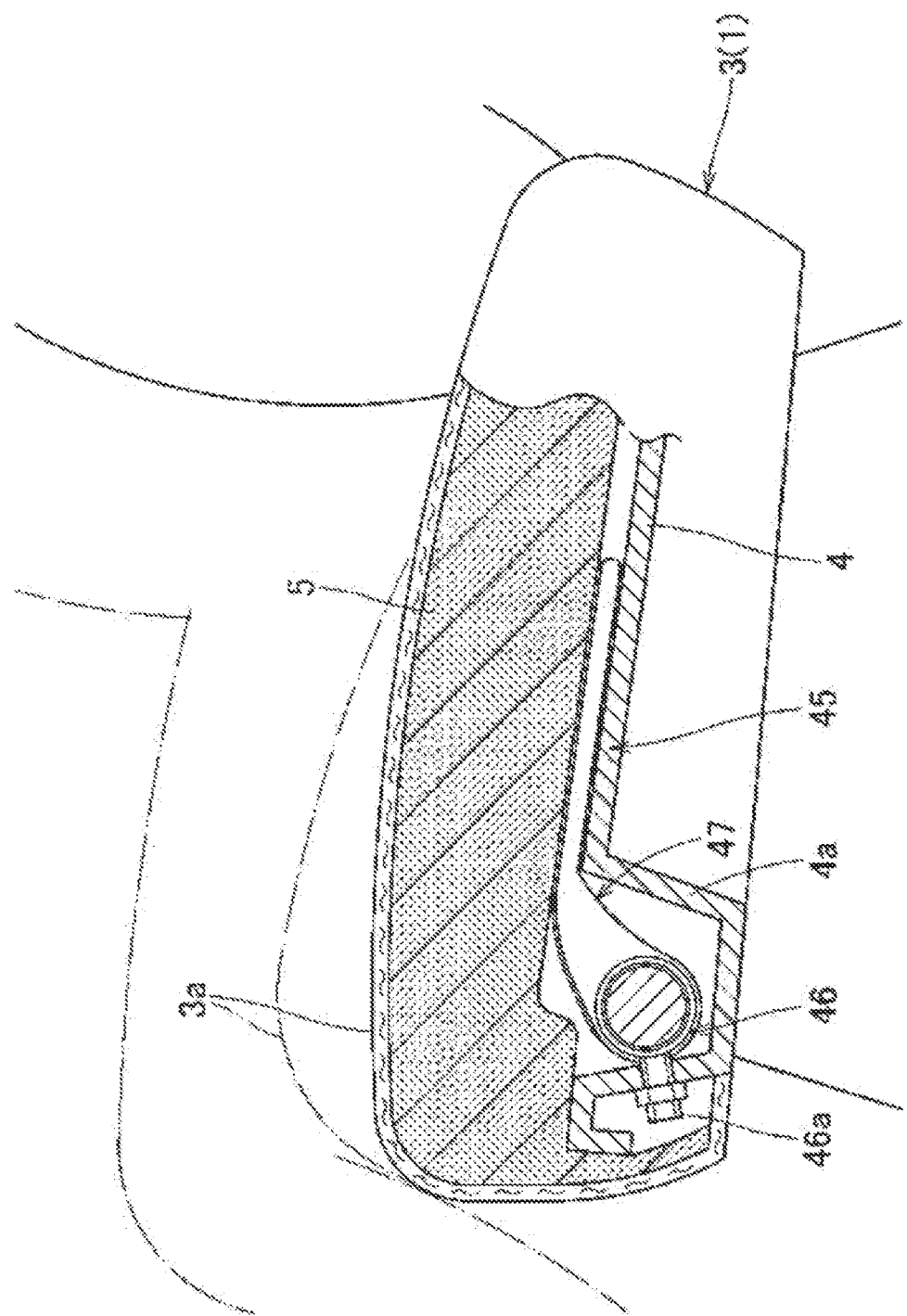
FIG. 7 is a schematic cross-sectional view of a seat portion of the seat equipped with the occupant protection device of the first embodiment.

As illustrated in FIG. 7, the seat airbag device 45 is arranged between a seat pan 4 made of sheet metal and a seat cushion 5 on the upper surface side of the seat pan 4 inside the seat portion 3 in the seat 1. The seat airbag device 45 includes a seat airbag 47 and an inflator 46 which supplies inflation gas to the seat airbag 47.

The inflator 46 is configured as a substantially columnar shape arranged in the seat airbag 47 so that the axial direction thereof is substantially along the left-right direction. In the case of the embodiment, the inflator 46 is configured to be attached to a mounting seat portion 4a formed so as to be recessed in a substantially box shape downward on the front end side of the seat pan 4 by using mounting means 46a protruding from the seat airbag 47.

The seat airbag 47 has a bag shape composed of a flexible seat body. As illustrated in FIG. 7, the seat airbag 47 is accommodated in a flatly unfolded state between the seat pan 4 and the seat cushion 5 so as to extend rearward from the inflator 46. This seat airbag 47 has an inflation completed shape of a substantially plate shape. In the seat airbag 47, the width dimension on the left-right direction side is set to be slightly smaller than the width dimension on the left-right direction side of the seat portion 3 (see FIG. 2) and the width dimension on the front-rear direction side when the inflation is completed is set to be slightly larger than half of the width dimension on the front-rear direction side of the seat portion 3 (see FIG. 8). Further, the seat airbag 47 is set so that the thickness dimension when the inflation is completed is such that the region on a front portion 3a side of the seat portion 3 can be raised upward. Then, when the inflation of the seat airbag 47 is completed, the region on the front portion 3a side of the seat portion 3 is raised upward in a wide range to the left and right. That is, the seat airbag 47 which has completed the inflation pushes up the region on the front end side (near a knee MK) of the thigh MT of the occupant MP (see the alternate long and short dash line in FIG. 7 and FIG. 8) and the forward movement of the buttocks can be prevented. As a result, a forward movement of the occupant MP that slides the waist MW forward can be regulated.

In the occupant protection device S1 of the first embodiment, when the front collision of the vehicle is detected, the inflator 22 of the front airbag device 20 operates and the inflation gas discharged from the inflator 22 flows into the bag body 31 via the conduit portion 38, Therefore, the bag body 31 ruptures the cover 27 and projects forward and upward from the lap belt 19 to complete the inflation as illustrated by the alternate long and short dash line in FIG. 4. Further, the inflator 46 of the seat airbag device 45 also operates and the inflation gas discharged from the inflator 46 flows into the seat airbag 47, and thus the seat airbag 47 completes the inflation, as illustrated in FIG. 8.

Figure 9:
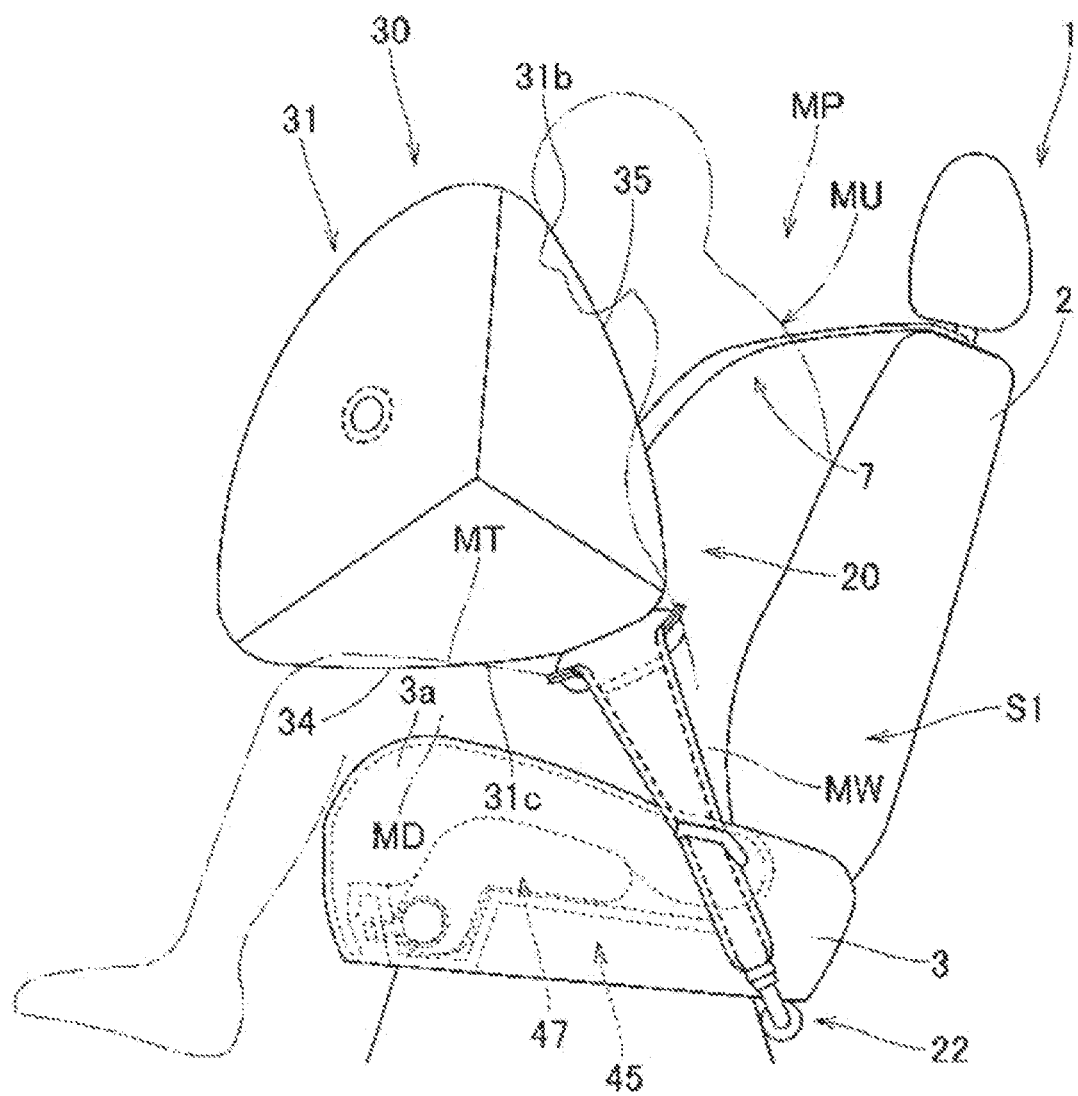
FIG. 9 is a side view illustrating a state in which an occupant is restrained by the front airbag which completes inflation in the occupant protection device of the first embodiment.

The occupant protection device S1 of the first embodiment has a configuration including the front airbag device 20 arranged in the area of the lap belt 10 and the seat airbag device 45 built in the seat portion 3 of the seat 1. As illustrated in FIG. 8, the occupant protection device S1 has a configuration in which the front airbag 30 inflates so as to cover the front of the occupant MP and the seat airbag 47 inflates so as to raise at least the front portion 3a side of the seat portion 3 upward. Therefore, the inflated seat airbag 47 regulates the forward movement of the buttocks of the occupant MP and can regulate the waist MW of the occupant MP from moving forward. Then, the occupant MP whose front movement of the waist MW is restricted by the seat airbag 47 is received by the front airbag 30 which is inflated so as to protrude forward and upward from the lap belt 10. In this case, the inflated front airbag 30 is arranged in front of the upper body MU of the occupant MP while bringing the thigh abutment surface 34 into contact with the upper surface of the thigh MT of the occupant MP. Therefore, even when the occupant MP in a state where the forward movement of the waist is suppressed by the seat airbag 47 moves so as to bring the upper body MU closer to the lower body MD as illustrated in FIG. 9, the front airbag 30 makes the thigh abutment surface 34 supported over a wide area by the thigh MT, and thus the collapse and compression are suppressed. As a result, the upper body MU (from the chest MB to the head) of the occupant MP can be accurately restrained by the upper body restraining surface 35.

Therefore, in the occupant protection device S1 of the first embodiment, the forward movement of the waist MW can be accurately regulated, and thus the occupant MP can be stably protected.

Figure 10:
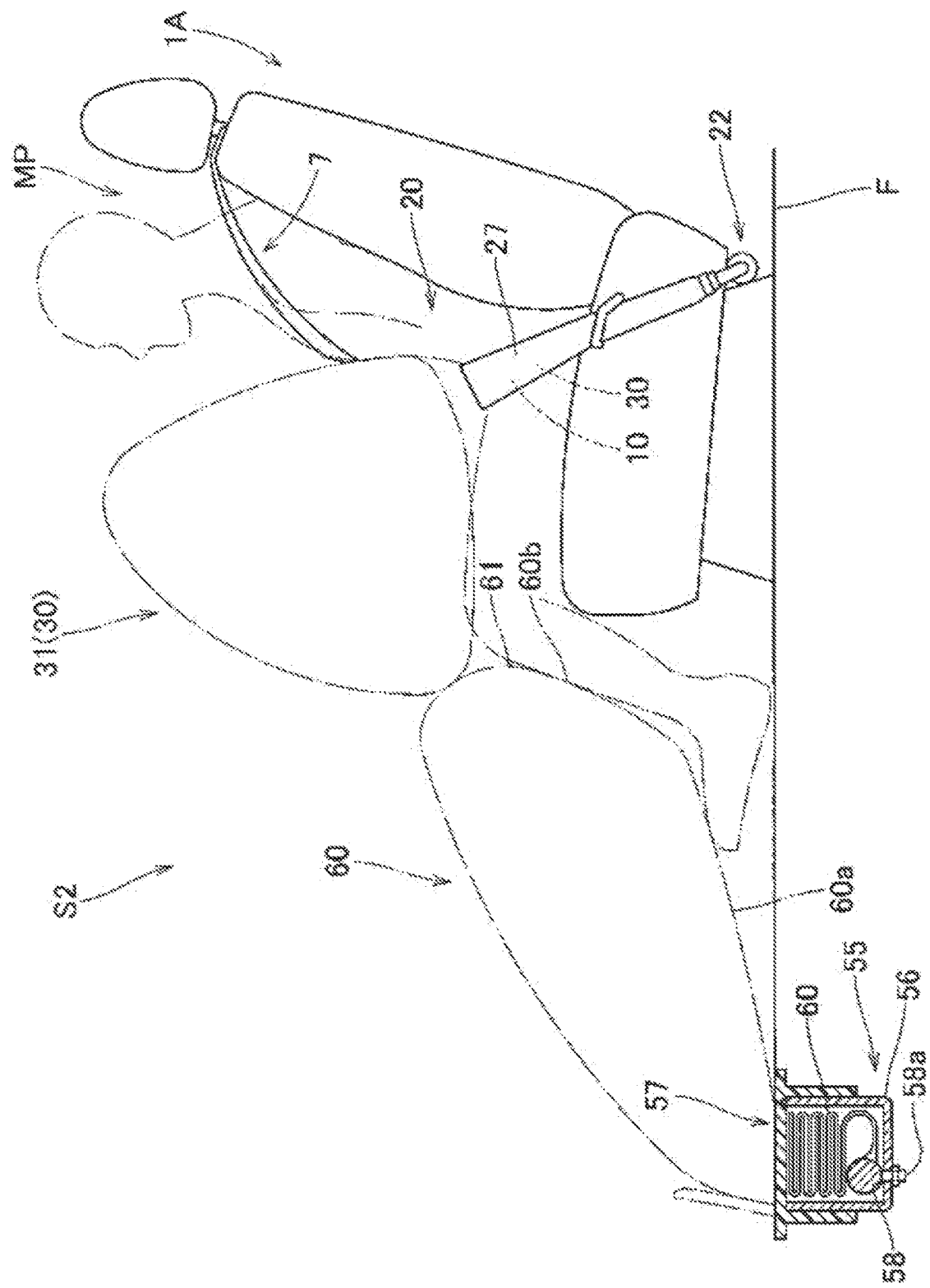
FIG. 10 is a schematic side view illustrating an occupant protection device according to a second embodiment of the invention.
Figure 11:
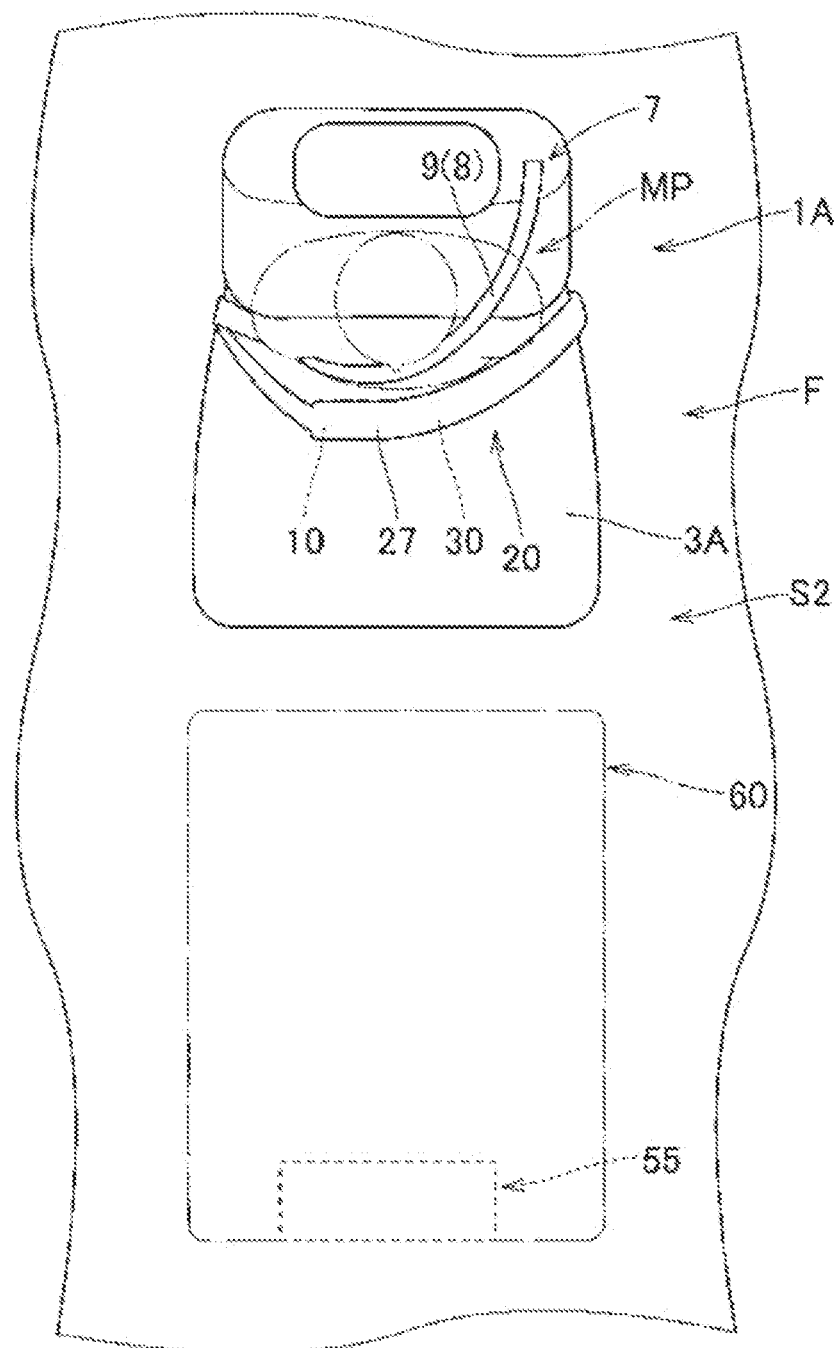
FIG. 11 is a schematic plan view illustrating the occupant protection device of the second embodiment.

Next, an occupant protection device S2 which is a second embodiment of the invention will be described. The occupant protection device S2 of the second embodiment is for protecting the occupant MP seated on a seat 1A which is fixed so as to be restricted from moving back and forth with respect to a floor F. As illustrated in FIGS. 10 and 11, the occupant protection device S2 includes the seat belt 7, the front airbag device 20, and a floor airbag device 55 arranged in front of the occupant MP seated on the seat TA on the floor F. Since the seat belt 7 and the front airbag device 20 have the same configuration as that of the seat belt 7 and the front airbag device 20 in the occupant protection device S1 described above, the same members are designated by the same reference numerals and letters and detailed description thereof will be omitted.

As illustrated in FIGS. 10 and 11, the floor airbag device 55 is arranged on the floor F at a position in front of the occupant MP seated on the seat 1A. The floor airbag device 55 includes a floor airbag 60, an inflator 58 which supplies inflation gas to the floor airbag 60, a case 56 for accommodating the folded floor airbag 60 and the inflator 58, and an airbag cover 57 which covers the upper part of the folded floor airbag 60 (the opening of the case 56).

The inflator 58 is configured as a substantially columnar shape arranged in the floor airbag 60 so that the axial direction thereof is substantially along the left-right direction. In the case of the embodiment, the inflator 58 is configured to be attached to a lower end side of the case 56 provided in the floor F by using mounting means 58a protruding from the floor airbag 60. The case 56 has a substantially box shape with the upper end side open. The airbag cover 57 is formed so as to be connected to the floor F and is configured to cover the opening of the case 56. The airbag cover 57 includes a door portion (the figure and reference number are not shown) which can be pushed and opened when the floor airbag 60 is deployed and inflated.

The floor airbag 60 has a bag shape composed of a flexible seat body and is folded and accommodated in the upper region of the inflator 58 in the case 56. The external shape of the floor airbag 60 when the inflation is completed has a substantially triangular prism shape in which the axial direction is substantially along the left-right direction. More specifically, the inflation completed shape of the floor airbag 60 when viewed from the left and right sides has a substantially right-angled triangle with a hypotenuse on the front side (see the alternate long and short dash line in FIG. 10) and the inflation completed shape of the floor airbag 60 when viewed from the vertical direction side has a substantially rectangular shape with the front-rear direction side wide (see the alternate long and short dash line in FIG. 11). Specifically, when the inflation of the floor airbag 60 is completed, a lower wall portion 60a on the lower surface side is brought close to the floor F so as to be substantially parallel to the floor F and a rear wall portion 601), which is the rear surface side, is arranged so as to be close to the front side of a shin ML of the occupant MP and substantially along the up-down direction (see FIG. 12). Further, in the floor airbag 60, the width dimension on the left-right direction side when the inflation is completed is substantially the same as the width dimension on the left-right direction side of a seat portion 3A in the seat 1A and the height dimension on a rear wall portion 60b side when the inflation is completed is set so that the upper end is located above the thigh MT of the occupant MP (see the alternate long and short dash line in FIGS. 10 and 11). In this floor airbag 60, the rear wall portion 60b when the inflation is completed is used as a shin restraining surface 61 and the front of the occupant MP from the shin ML to the knee MK can be covered over substantially the entire surface by the shin restraining surface 61 (rear wall portion 60b). Then, when the inflation of the floor airbag 60 is completed, the lower surface side of the floor airbag 60 is supported by the floor F and the occupant MP from the shin ML to the knee MK, which is about to move forward, can be pressed by the shin restraining surface 61 (rear wall portion 60b) over substantially the entire area. Therefore, the forward movement of the buttocks can be prevented, and thus the forward movement of the occupant MP that slides the waist MW forward can be regulated (see FIG. 12).

Figure 12:
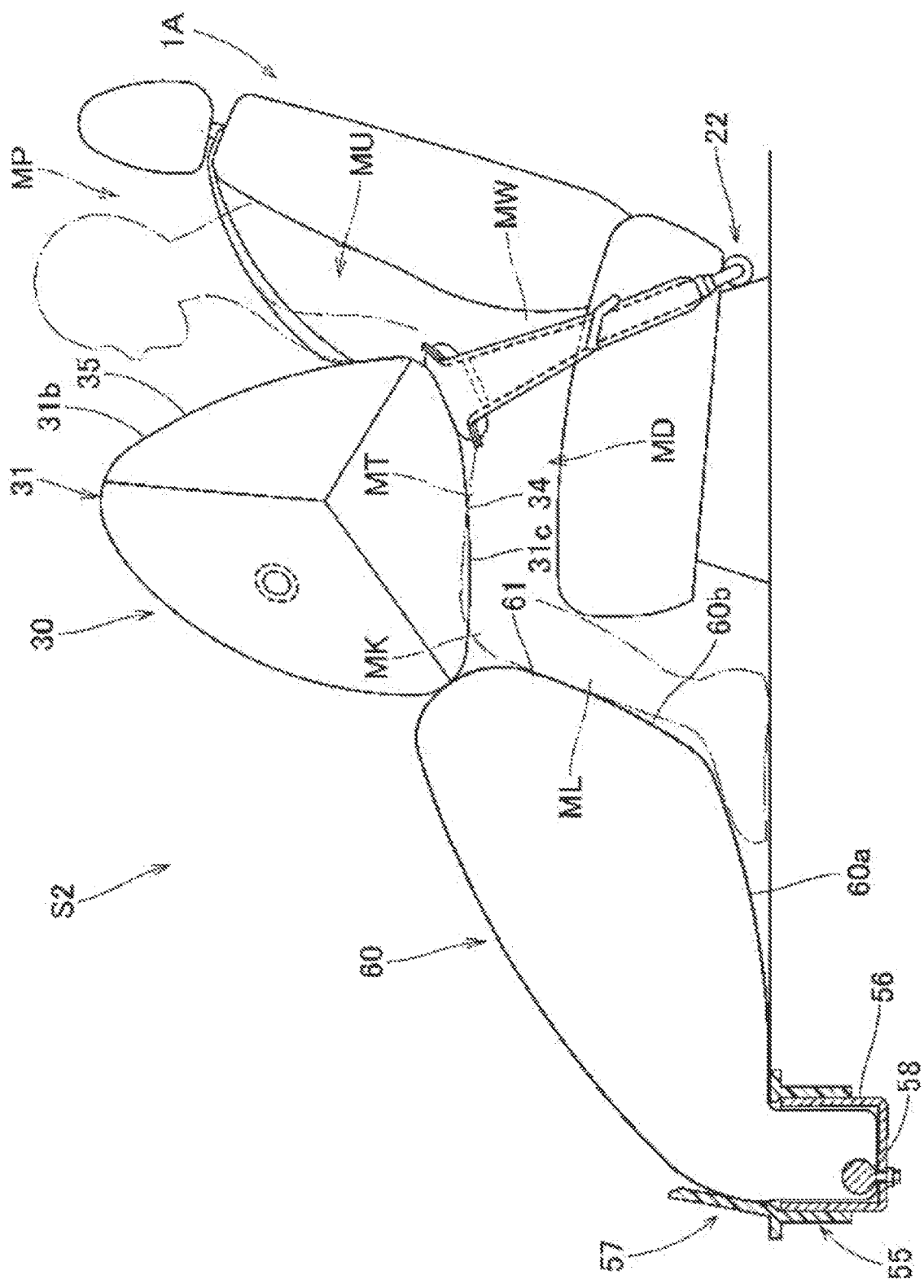
FIG. 12 is a schematic view of a state in which a front airbag and a floor airbag complete inflation in the occupant protection device of the second embodiment.

In the occupant protection device S2 having such a configuration, when the front collision of the vehicle is detected, the inflator 22 of the front airbag device 20 operates and the inflation gas discharged from the inflator 22 flows into the bag body 31 via the conduit portion 38. Therefore, as illustrated in FIG. 12, the bag body 31 completes the inflation while projecting forward and upward from the lap belt so as to break the cover 27. In addition, the inflator 58 of the floor airbag device 55 also operates and the inflation gas discharged from the inflator 58 flows into the floor airbag 60. Therefore, the floor airbag 60 completes the inflation, as illustrated in FIG. 12.

Then, in the occupant protection device S2 of the second embodiment, since the seat 1A is fixed so as to be restricted from moving back and forth with respect to the floor F, the floor airbag device 55 arranged in front of the occupant MP seated on the seat 1A can inflate the floor airbag 60 in a state where the distance to the seat 1A is constant at the time of operation. Therefore, the floor airbag 60 can be inflated so as to accurately cover the front of the occupant MP from the shin ML to the knee MK without being extremely far apart or extremely close to the seat 1A. Therefore, by covering the area from the shin ML to the knee MK with the inflated floor airbag 60, the forward movement of the buttocks of the occupant MP can be restricted and the waist MW of the occupant MP can be restricted from moving forward. Then, as illustrated in FIG. 12, the occupant MP in which the forward movement of the waist MW is suppressed is received by the front airbag 30 which inflates so as to protrude forward and upward from the lap belt 10, In this case, the front airbag 30 is arranged in front of the upper body MU of the occupant MP while bringing the thigh abutment surface 34 into contact with the upper surface of the thigh MT of the occupant MR. Therefore, even when the occupant NIP in a state where the forward movement of the waist MW is suppressed by the floor airbag 60 moves the upper body MU closer to the lower body MD, since the front airbag 30 makes the thigh abutment surface 34 supported over a wide area by the thigh, and thus the collapse and compression are suppressed. As a result, the upper body MU (from chest MB to the head) of the occupant MP can be accurately restrained by the upper body restraining surface 35.

Therefore, also in the occupant protection device S2 of the second embodiment, the forward movement of the waist MW can be accurately regulated, and thus the occupant MP can be stably protected.

Figure 13:
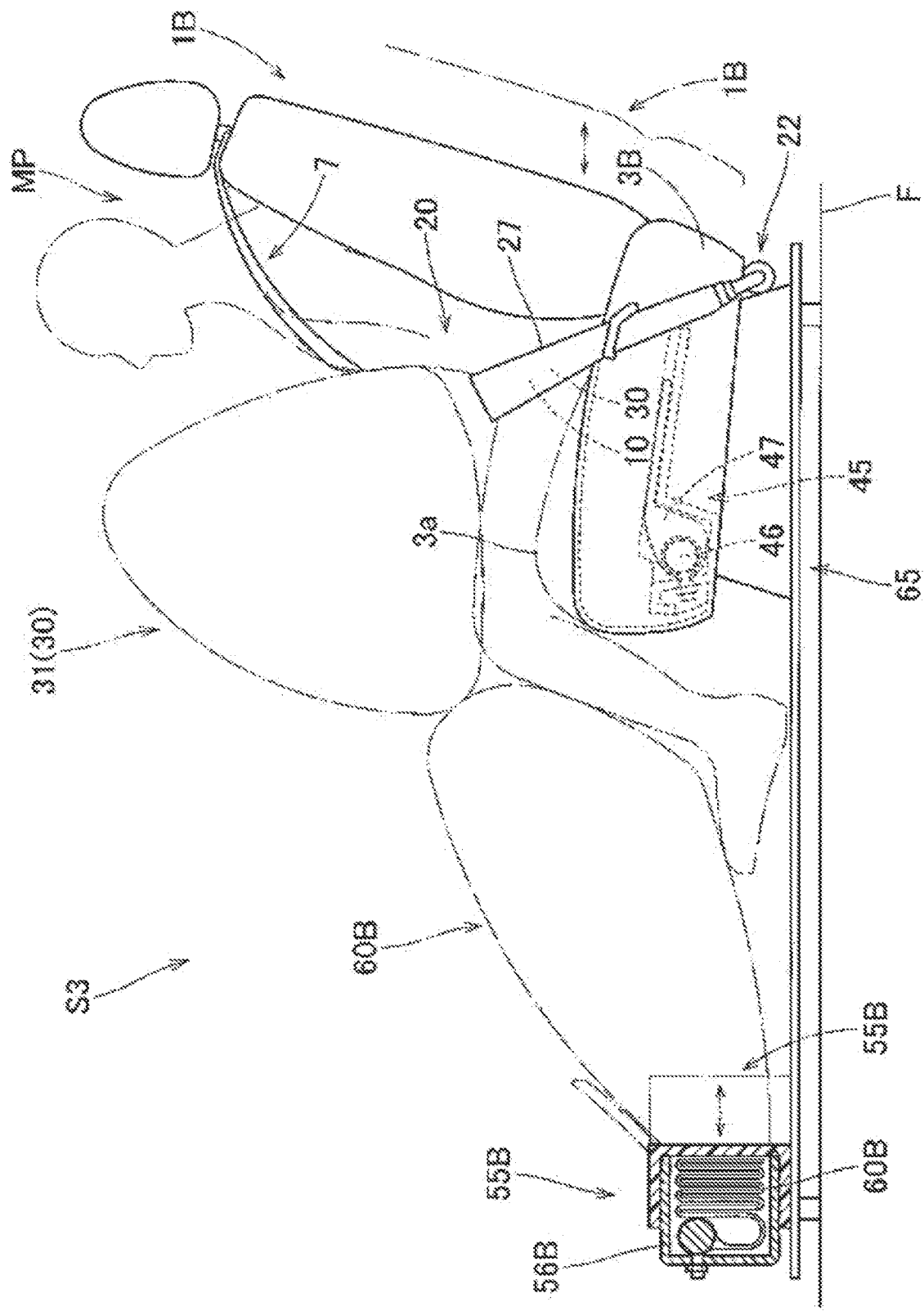
FIG. 13 is a schematic side view illustrating an occupant protection device according to a third embodiment of the invention.

Next, an occupant protection device S3 which is a third embodiment of the invention will be described. The occupant protection device S3 of the third embodiment is for protecting the occupant MP seated on a seat 1B. As illustrated in FIG. 13, the occupant protection device S3 includes the seat belt 7, the front airbag device 20, the seat airbag device 45, and a floor airbag device 55B. Since the seat belt 7, the front airbag device 20, and the seat airbag device 45 have the same configuration as those of the seat belt 7, the front airbag device 20, and the seat airbag device 45 in the occupant protection device S1 described above, the same members are designated by the same reference numerals and letters and detailed description thereof will be omitted. The seat 1B is configured to be slidable back and forth with respect to the floor F. The floor airbag device 55B is configured to be able to slide back and forth following the slide movement of the seat 1B. In the case of the embodiment, the seat 1B and the floor airbag device 55B are connected to each other by a connecting member 65 having a guide block and a rail and are both attached by using the connecting member 65 so as to be slidable back and forth with respect to the floor F (see the alternate long and short dash line in FIG. 13). This floor airbag device 55B has the same configuration as the floor airbag device 55 in the above-described occupant protection device S2 except that it is connected to the seat 1B side using the connecting member 65 and an opening of the case 56B is arranged so as to face the rear side. Thus, a "B" is added to the end of the same reference numerals and letters to the same member and detailed description thereof will be omitted.

Figure 14:
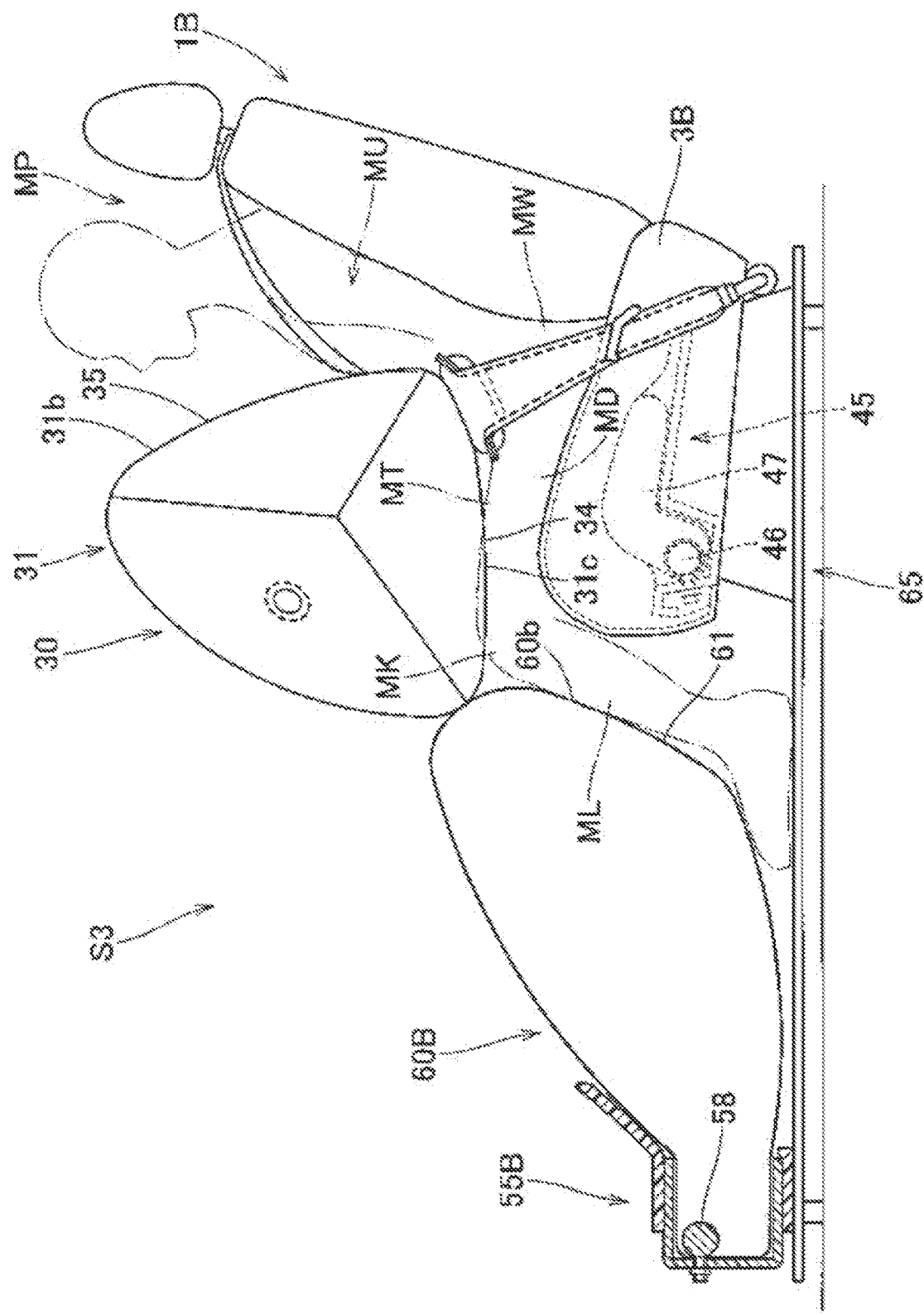
FIG. 14 is a schematic view of a state in which a front airbag, a seat airbag, and a floor airbag complete inflation in the occupant protection device of the third embodiment.

In the occupant protection device S3 with such a configuration, since the floor airbag device 55B placed in front of the occupant seated on the seat 1B on the floor is configured to be slidable following the slide movement of the seat 1B, at the time of operation, a floor airbag 60B can be inflated with a constant distance from the seat 1B. Therefore, the floor airbag 60B can be inflated so as to accurately cover the front of the occupant MP from the shin ML to the knee MK without being extremely far apart or extremely close to the seat 1B (see FIG. 14). Furthermore, in the occupant protection device S3, the seat airbag device 45 is built in a seat portion of the seat 1B and the seat airbag 47 is configured to inflate so as to raise at least the front portion 3a side of the seat portion 3B upward, Therefore, the inflated floor airbag 60B and the seat airbag 47 regulate the forward movement of the buttocks of the occupant MP and the waist MW of the occupant MP can be accurately regulated to move forward. Then, as illustrated in FIG. 14, the occupant MP in which the forward movement of the waist MW is suppressed is received by the front airbag 30 which inflates so as to protrude forward and upward from the lap belt 10, In this case, the front airbag 30 is arranged in front of the upper body MU of the occupant MP while bringing the thigh abutment surface 34 into contact with the upper surface of the thigh MT of the occupant MP. Therefore, even when the occupant MP in a state where the forward movement of the waist MW is suppressed by the floor airbag 60B and the seat airbag 47 moves the upper body MU closer to the lower body MD, since the front airbag 30 makes the thigh abutment surface 34 supported over a wide area by the thigh MT, and thus the collapse and compression are suppressed. As a result, the upper body MU (from the chest to the head) of the occupant MP can be accurately restrained by the upper body restraining surface 35.

Therefore, even in the occupant protection device S3 of the third embodiment, the forward movement of the waist MW can be accurately regulated, and thus the occupant MP can be stably protected.

In the occupant protection devices S1, S2, and S3 of the embodiments, the inflation completed shape of the front airbag 30 (bag body 31) has a substantially triangular prism shape in which the axial direction is substantially along the left-right direction. Also, when the occupant MP moves the upper body MU closer to the lower body MD by a large extent when the inflation of the front airbag 30 is completed, the bag body 31 is suppressed from being compressed and collapsing so as to bring the upper body restraining surface 35 closer to the thigh abutment surface 34. As a result, the upper body MU of the occupant MP can be accurately restrained by the bag body 31 (front airbag 30). Further, the inflation completed shape of the front airbag is not limited to those of the embodiments as long as it includes the thigh abutment surface and the upper body restraining surface. For example, as the front airbag, an airbag having a shape in which the inflation completed shape when viewed from the left-right direction side is substantially L-shaped may be used.

What is claimed is:

1. An occupant protection device which protects an occupant seated in a seat comprising:
   a seat belt;
   a front airbag device provided with a front airbag which is placed in an area of a lap belt which restrains a waist of the occupant in the seat belt when worn and inflates to cover afront of the occupant when operated;
   a seat airbag device provided with a seat airbag which is arranged inside a seat portion in the seat and inflates so as to raise at least a front portion side of the seat portion upward when operated to regulate a forward movement of the occupant; and
   a floor airbag device provided with a floor airbag which can be slidably moved following a sliding movement of the seat in front of the occupant seated on the seat on a floor and inflates to cover a front of a knee of the occupant when operated to regulate a forward movement of the occupant, wherein
   the front airbag causes inflation gas to flow into the inside and inflates so as to protrude forward and upward when operated and at high abutment surface capable of abutting on a thigh of the occupant and an upper body restraining surface capable of restraining an upper body of the occupant are arranged on an outer peripheral surface of the front airbag when the inflation is completed.

* * * * *